United States Patent
Naik (10) Patent No.: US 9,219,611 B1
(45) Date of Patent: Dec. 22, 2015

(54) SYSTEMS AND METHODS FOR AUTOMATING CLOUD-BASED CODE-SIGNING SERVICES

(71) Applicant: Symantec Corporation, Mountain View, CA (US)

(72) Inventor: Alok Naik, Bangalore (IN)

(73) Assignee: Symantec Corporation, Mountain View, CA (US)

(*) Notice: Subject to any disclaimer, the term of this patent is extended or adjusted under 35 U.S.C. 154(b) by 0 days.

(21) Appl. No.: 14/185,165

(22) Filed: Feb. 20, 2014

(51) Int. Cl.
*H04L 29/06* (2006.01)
*H04L 9/32* (2006.01)

(52) U.S. Cl.
CPC .............. *H04L 9/3247* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 2007/0074031 A1* | 3/2007 | Adams et al. | 713/176 |
| 2007/0074034 A1* | 3/2007 | Adams et al. | 713/176 |
| 2012/0019361 A1* | 1/2012 | Ben Ayed | 340/5.83 |
| 2012/0204032 A1* | 8/2012 | Wilkins et al. | 713/170 |
| 2013/0111208 A1* | 5/2013 | Sabin et al. | 713/171 |
| 2013/0298208 A1* | 11/2013 | Ayed | 726/6 |
| 2014/0019762 A1* | 1/2014 | Sabin | 713/176 |
| 2014/0033188 A1* | 1/2014 | Beavers et al. | 717/170 |

OTHER PUBLICATIONS

"jarsigner", http://docs.oracle.com/javase/7/docs/technotes/tools/windows/jarsigner.html, as accessed Dec. 16, 2013, Oracle, (Nov. 20, 2011).
"SignTool.exe (Sign Tool)", http://msdn.microsoft.com/en-us/library/8s9b9yaz(v=vs.110).aspx, as accessed Dec. 16, 2013, Microsoft, (Oct. 6, 2011).
"apk-signer", http://code.google.com/p/apk-signer/, as accessed Dec. 16, 2013, (Mar. 3, 2012).
"Jupiter API—The Joint Universal Parameter IdenTification and Evaluation of Reliability Application Programming Interface", http://water.usgs.gov/software/JupiterApi/, as accessed Dec. 16, 2013, (Nov. 14, 2009).
"SAS", http://www.sas.com/en_us/home.html, as accessed Dec. 16, 2013, SAS Institute, Inc., (Dec. 16, 2013 or earlier).
"Code Signing Credentials for Windows Mobile FAQ", http://www.geotrust.com/support/code-signing/smartphone-faq.html, as accessed Dec. 16, 2013, GeoTrust, Inc., (Nov. 6, 2008).

* cited by examiner

*Primary Examiner* — Kaveh Abrishamkar
(74) *Attorney, Agent, or Firm* — ALG INTELLECTUAL PROPERTY, LLC (57) ABSTRACT

A computer-implemented method for automating cloud-based code-signing services may include identifying, at a cloud-based code-signing service, an automatically generated request from a signing automation agent on a remote client to sign at least one file. The method may further include verifying a security credential that authorizes the remote client to access the cloud-based code-signing service. The method may also include receiving, at the cloud-based code-signing service, the file from the signing automation agent. The method may additionally include signing, by the cloud-based code-signing service, the file. The method may further include sending the signed file from the cloud-based code-signing service to the remote client. Various other methods, systems, and computer-readable media are disclosed.

20 Claims, 7 Drawing Sheets

SYSTEMS AND METHODS FOR AUTOMATING CLOUD-BASED CODE-SIGNING SERVICES

BACKGROUND

Software developers often use their own customized tools to automatically sign their code. For example, developers may use a combination of make files and code-signing tools (e.g., jarsigner) to automatically build and sign code for testing or other non-commercial purposes using a self-signed certificate. However, when a developer wants to sign their code with a production certificate (which may be used for commercial sale or formal distribution), they need to obtain certificates provided by a trusted Certificate Authority (CA). Some CAs may provide code-signing services that allow developers to upload their code to a code-signing server, where it is then signed with a certificate from the CA and sent back to the developer. While this may simplify the process needed to obtain software signed with a publically trusted CA's certificate, it may generally require that the developer sign into a web portal using a web browser and then upload the code to a code-signing server. In addition, this solution may inadequately address the needs of large build-room environments where multiple developers are working on the same project (often continuously building and signing their software in a Continuous Integration (CI) type environment) as it may disrupt existing build processes and systems.

What is needed, therefore, is a more efficient and effective mechanism for automating cloud-based code-signing services.

SUMMARY

As will be described in greater detail below, the instant disclosure generally relates to systems and methods for automating cloud-based code-signing services. For example, a method for automating cloud-based code-signing services may include identifying, at a cloud-based code-signing service, an automatically generated request from a signing automation agent on a remote client to sign at least one file. The method may further include verifying a security credential that authorizes the remote client to access the cloud-based code-signing service. The method may also include receiving, at the cloud-based code-signing service, the file from the signing automation agent. The method may additionally include signing, by the cloud-based code-signing service, the file. The method may further include sending the signed file from the cloud-based code-signing service to the remote client.

In some embodiments an automated build tool may include the signing automation agent. In addition, the automated build tool may be configured to automatically sign the file via the cloud-based code-signing service as part of a build process that builds the file via a series of one or more code-building steps.

In at least one embodiment, the above-described method may further include requesting, by the cloud-based code-signing service, second factor authentication from a code-signing administrator. In various examples, the method may also include receiving, at the cloud-based code-signing service, second factor authentication from the code-signing administrator. In at least one example, signing the file may include signing the file with a production certificate after receiving second factor authentication from the code-signing administrator. Alternatively, signing the file may include signing the file with a test certificate when no second factor authentication occurs.

In a variety of embodiments, the signing automation agent may include a file-sharing module that is configured to share files with the cloud-based code-signing service. In these embodiments, identifying the automatically generated request from the signing automation agent may include receiving the file from the file-sharing module. In some embodiments, verifying the security credential may include verifying a secure connection between the file-sharing module and the cloud-based code-signing service. In at least one embodiment, sending the signed file from the cloud-based code-signing service to the automated signing agent may include sharing the signed file with the file-sharing module.

In one embodiment, a system for implementing the above-described method may include an identification module, stored in memory, that identifies, at a cloud-based code-signing service, an automatically generated request from a signing automation agent on a remote client to sign at least one file. The system may further include a verification module, stored in memory, that verifies a security credential that authorizes the remote client to access the cloud-based code-signing service. The system may additionally include a reception module, stored in memory, that receives the file from the signing automation agent. The system may also include a signature module, stored in memory, that signs, by the cloud-based code-signing service, the file. The system may further include a transfer module, stored in memory, that sends the signed file from the cloud-based code-signing service to the remote client. The system may also include at least one physical processor that executes the identification module, the verification module, the reception module, the signature module, and the transfer module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to identify, at a cloud-based code-signing service, an automatically generated request from a signing automation agent on a remote client to sign at least one file. The one or more computer-executable instructions may further cause the computing device to verify a security credential that authorizes the remote client to access the cloud-based code-signing service. The one or more computer-executable instructions may also cause the computing device to receive, at the cloud-based code-signing service, the file from the signing automation agent. The one or more computer-executable instructions may additionally cause the computing device to sign, by the cloud-based code-signing service, the file. The one or more computer-executable instructions may finally cause the computing device to send the signed file from the cloud-based code-signing service to the remote client.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for automating cloud-based code-signing services. As will be explained in greater detail below, the systems and methods described herein may receive, at a cloud-based code-signing service, a file sent from a remote computing device. The systems and methods presented herein may then, via the cloud-based code-signing service, sign the file and send the signed file back to the remote computing device. In some embodiments, the cloud-based code-signing service may utilize a file sharing module to sign and share files with a remote computing device. By integrating cloud-based code-signing services with automated build tools, the systems and methods herein may provide developers with a hands-free, easy-to-use code signing service that can seamlessly integrate with existing automated build processes.

The following will provide, with reference to FIGS. 1-2 and 4-5, detailed descriptions of exemplary systems for automating cloud-based code-signing services. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

Figure 1:
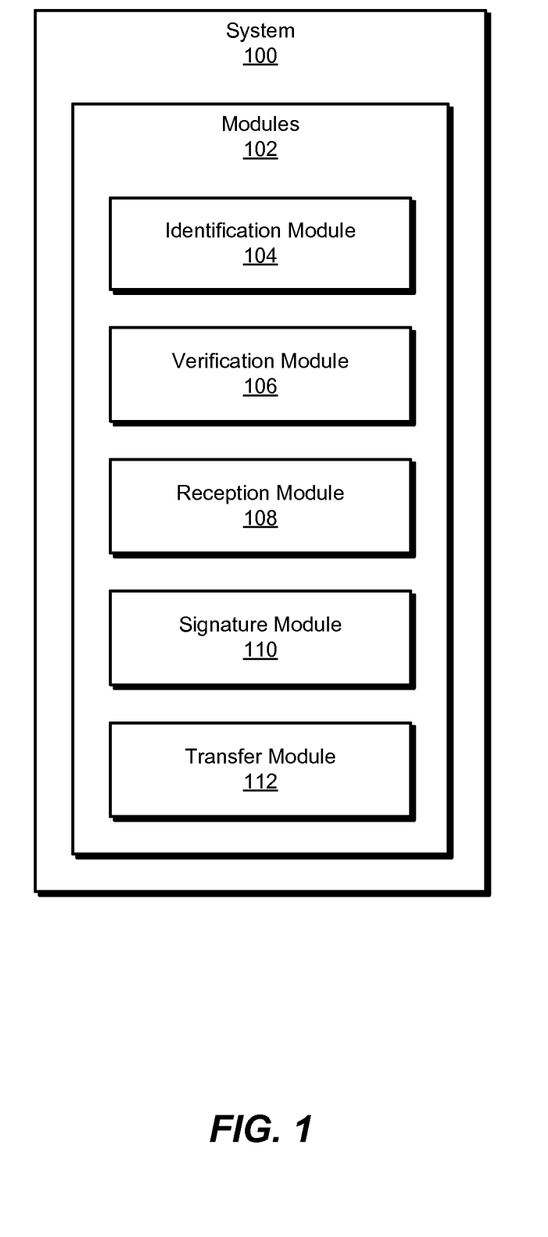
FIG. 1 is a block diagram of an exemplary system for automating cloud-based code-signing services.

FIG. 1 is a block diagram of an exemplary system 100 for automating cloud-based code-signing services. As illustrated in this figure, exemplary system 100 may include one or more modules 102 for performing one or more tasks. For example, and as will be explained in greater detail below, exemplary system 100 may include an identification module 104 that identifies, at a cloud-based code-signing service, an automatically generated request from a signing automation agent on a remote client to sign at least one file. Exemplary system 100 may also include a verification module 106 that verifies a security credential that authorizes the remote client to access the cloud-based code-signing service. Exemplary system 100 may further include a reception module 108 that receives the file from the signing automation agent. Exemplary system 100 may additionally include a signature module 110 that signs, by the cloud-based code-signing service, the file. System 100 may also include a transfer module 112 that sends the signed file from the cloud-based code-signing service to the remote client. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., remote client 202 and/or code-signing server 206), software security server 402 and/or coding computer 418 in FIG. 4, software security server 502 and/or coding computer 514 in FIG. 5, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
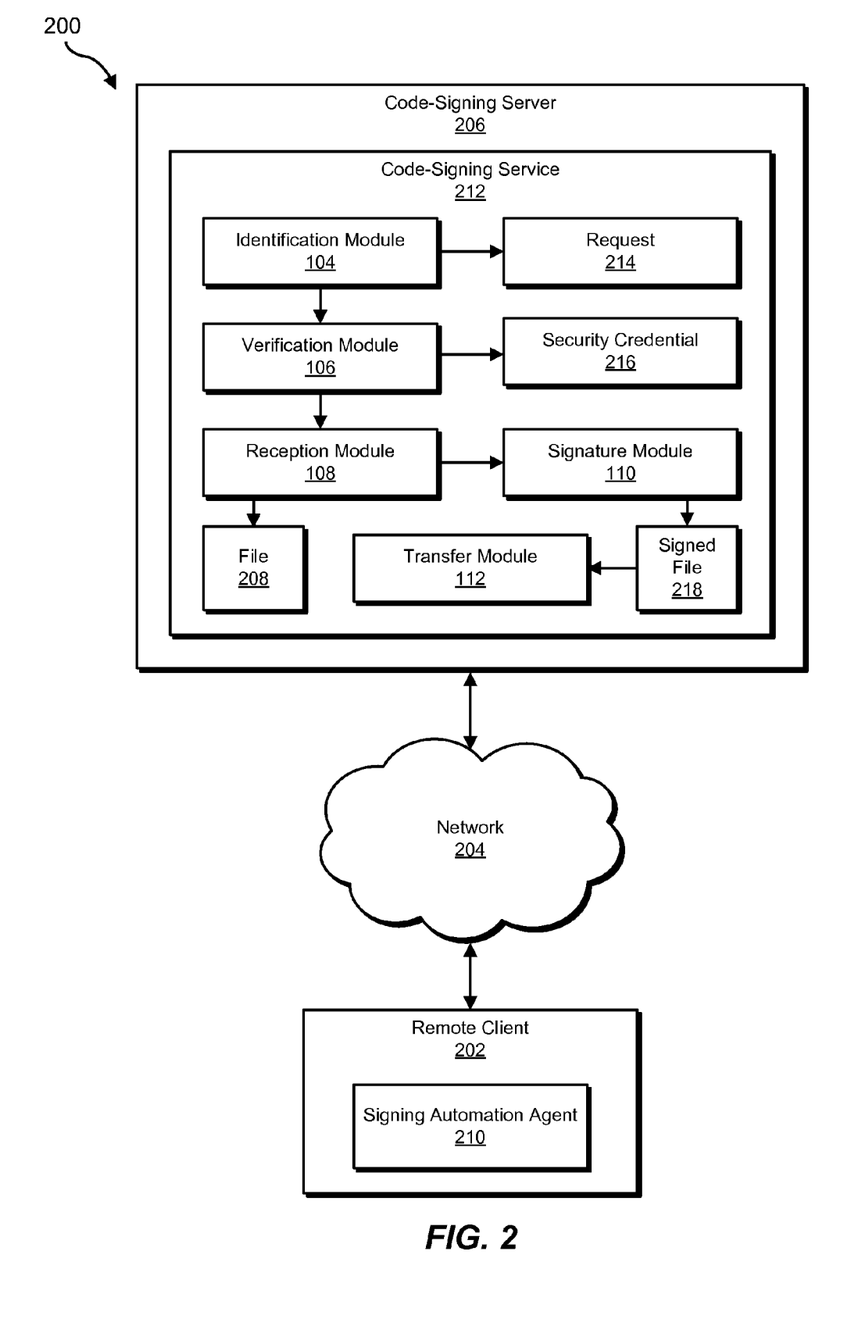
FIG. 2 is a block diagram of an additional exemplary system for automating cloud-based code-signing services.

Exemplary system 100 in FIG. 1 may be implemented in a variety of ways. For example, all or a portion of exemplary system 100 may represent portions of exemplary system 200 in FIG. 2. As shown in FIG. 2, system 200 may include a remote client 202 in communication with a code-signing server 206 via a network 204. In one example, code-signing server 206 may be programmed with one or more of modules 102.

In one embodiment, one or more of modules 102 from FIG. 1 may, when executed by at least one processor of code-signing server 206, enable code-signing server 206 to sign a file 208 received from a remote client 202. For example, and as will be described in greater detail below, identification module 104 may identify, at code-signing service 212, a request 214 from a signing automation agent 210 on remote client 202 to sign file 208. Verification module 106 may then verify a security credential 216 that authorizes remote client 202 to access code-signing service 212. In addition, reception module 108 may receive file 208 from signing automation agent 210. Signature module 110 may also sign, by code-signing service 212, file 208. In addition, transfer module 112 may send signed file 218 from code-signing service 212 to remote client 202.

Remote client 202 generally represents any type or form of computing device capable of reading computer-executable instructions. In at least one example, remote client 202 may be a computing device configured to access cloud-based code-signing services on a remote server, as illustrated in FIG. 2. Examples of remote client 202 include, without limitation, laptops, tablets, desktops, servers, cellular phones, software developer workstations, software developer servers, Personal Digital Assistants (PDAs), multimedia players, embedded systems, combinations of one or more of the same, coding computer 418 in FIG. 4, coding computer 514 in FIG. 5, exemplary computing system 610 in FIG. 6, or any other suitable computing device.

Code-signing server 206 generally represents any type or form of computing device that is capable of providing software signing services to remote clients. For example, code-signing server 206 may belong to a Certificate Authority (CA), and as such may be configured to sign files that are received from remote clients with certificates from a publically trusted CA. Examples of code-signing server 206 include, without limitation, application servers, code-signing servers, and/or database servers configured to provide various database services and/or run certain software applications, such as cloud-based code-signing software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), network 412 in FIG. 4, internet 512 in FIG. 5, exemplary network architecture 700 in FIG. 7, or the like. Network 204 may facilitate communication or data transfer using wireless or wired connections. In one embodiment, network 204 may facilitate communication between remote client 202 and code-signing server 206.

Figure 3:
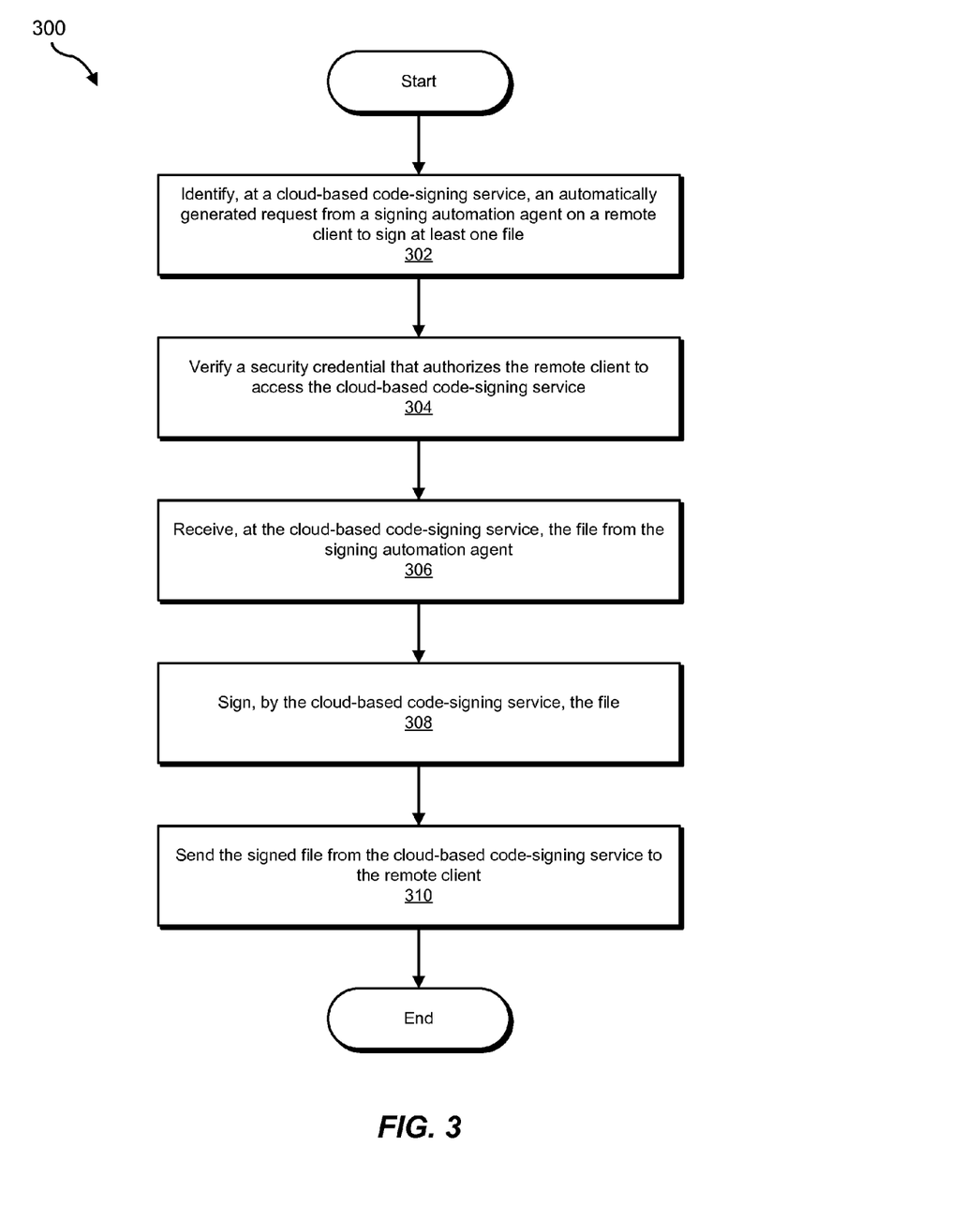
FIG. 3 is a flow diagram of an exemplary method for automating cloud-based code-signing services.

FIG. 3 is a flow diagram of an exemplary computer-implemented method 300 for automating cloud-based code-signing services. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, system 400 in FIG. 4, system 500 in FIG. 5, computing system 610 in FIG. 6, and/or portions of exemplary network architecture 700 in FIG. 7.

As illustrated in FIG. 3, at step 302 one or more of the systems described herein may identify, at a cloud-based code-signing service, an automatically generated request from a signing automation agent on a remote client to sign at least one file. For example, identification module 104 may, as part of code-signing service 212 in FIG. 2, identify a request 214 from signing automation agent 210 on remote client 202 to sign file 208.

Figure 4:
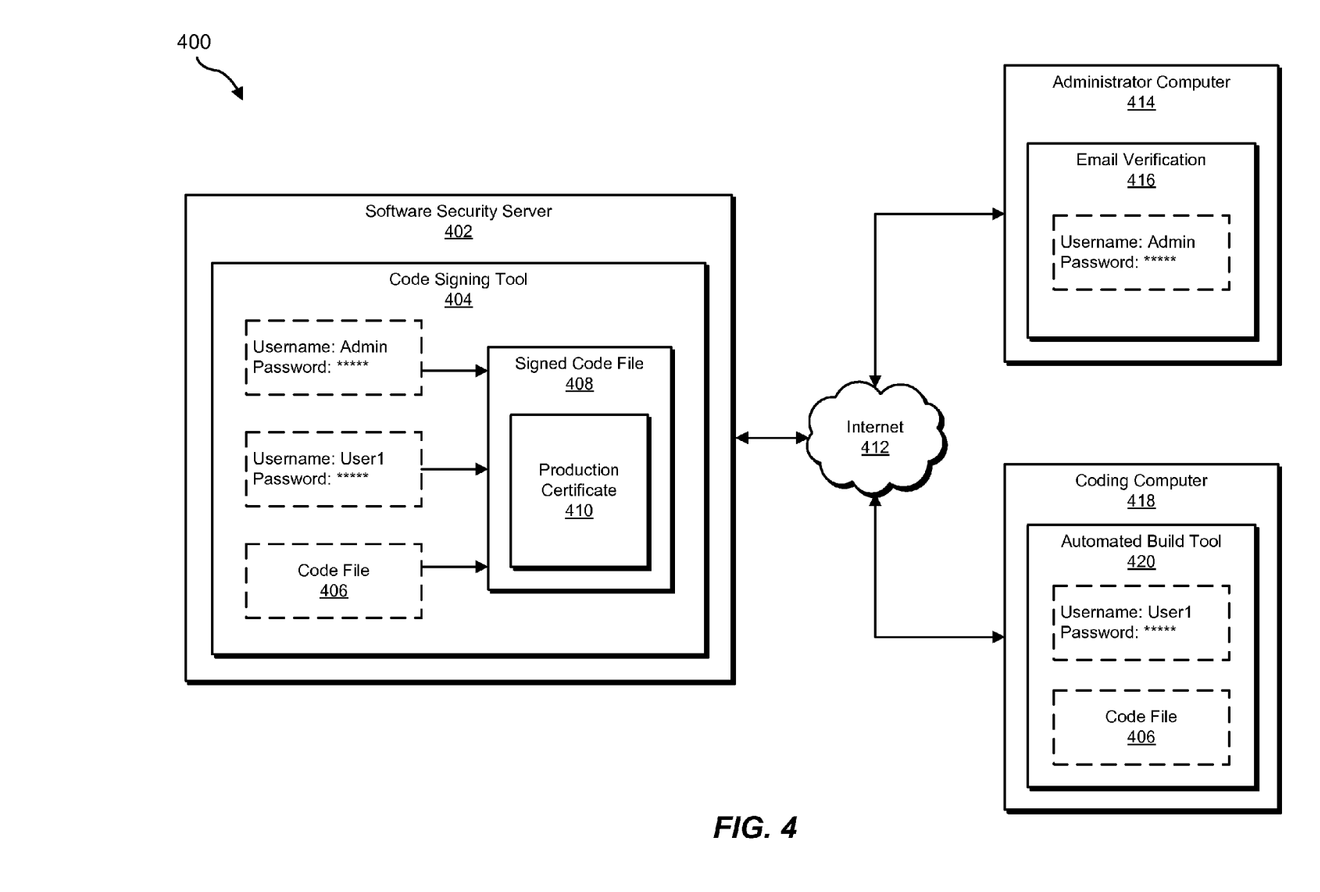
FIG. 4 is a block diagram of an exemplary code-signing server in communication with an automated build tool on a remote computer.
Figure 5:
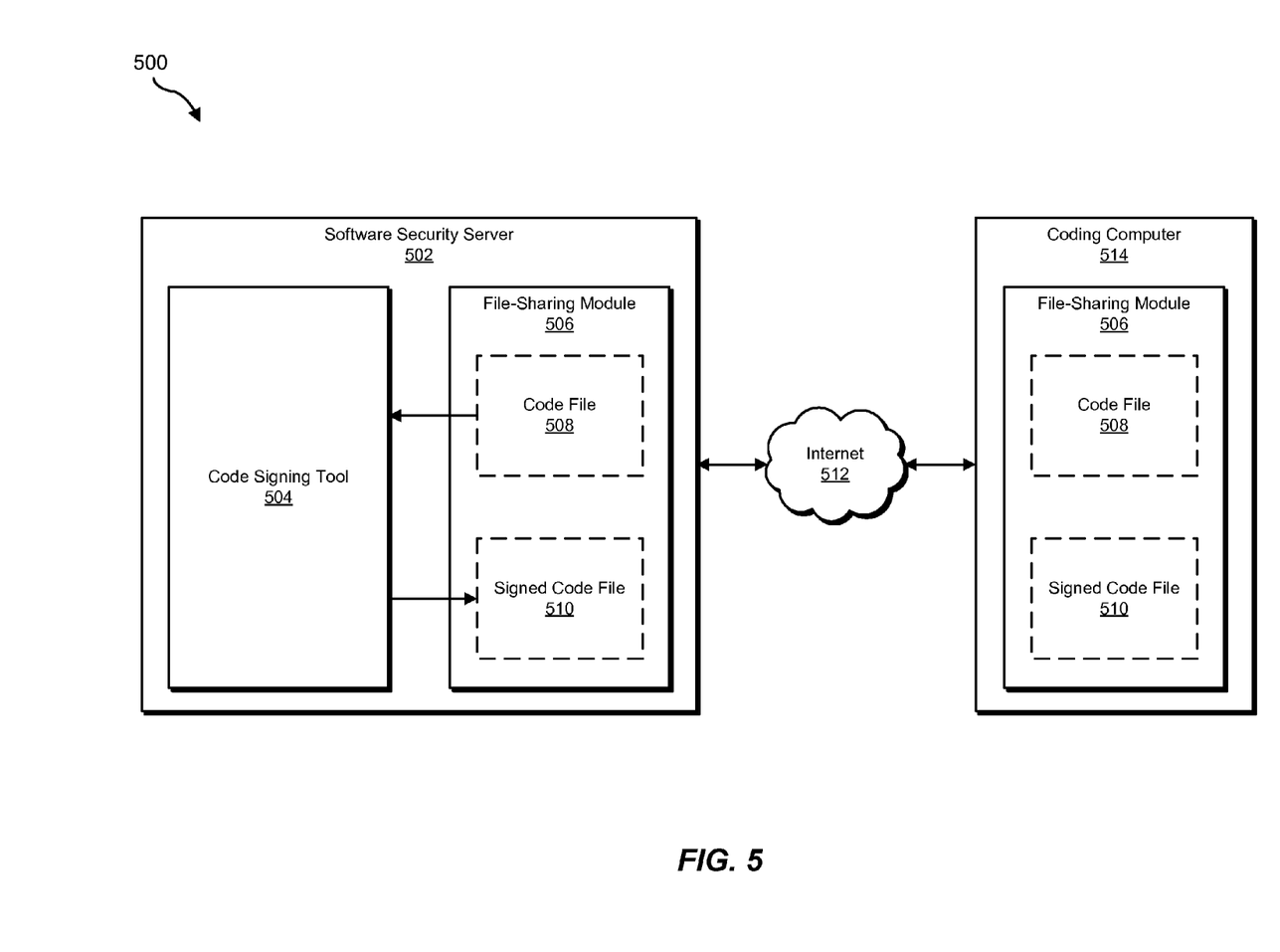
FIG. 5 is a block diagram of a cloud-based code-signing service configured to sign and share files with a remote computing device via a file-sharing module.

As used herein, the phrase "cloud-based code-signing service" generally refers to any code-signing service, application, and/or software module that is configured to receive and sign files (e.g., code files) at a remote server. For example, a cloud-based code-signing service may include a CA server that receives and signs files via a web portal. In addition, a cloud-based code-signing service may be configured to run on a single server, across multiple servers in an enterprise environment, or on any other suitable server configuration. A cloud-based code-signing service may include one or more software modules configured to perform specific functions. For example, a cloud-based code-signing service may include a module that receives files, a module that verifies security credentials, a module that signs files, etc. These software modules may be configured in a variety of ways across a variety of server configurations and are not limited to execution on a single server as depicted in FIGS. 2, 4, and 5. For example, verification module 106 may be stored on a security server, while signature module 110 may be stored on a code-signing server, and these two modules may communicate with each other via a network protocol to provide remote clients a cloud-based code-signing service.

In addition, a remote client may access a cloud-based code-signing service in a variety of ways. For example, a remote client may access a cloud-based code-signing service via a web portal, a file-sharing module, a custom-built developer tool, an Application Programming Interface (API) layer, a web protocol, and/or any other suitable mechanism or protocol for accessing services on a remote server. A cloud-based code-signing service may also be configured to receive a variety of files in a variety of file formats and may sign files using a variety of signature algorithms and digital certificate types.

As used herein, the phrase "automatically generated request" may refer to any type or form of computing request that is generated without manual intervention. For example, an automatically generated request may include a request that is generated by a software module on a computing device, in contrast to requests activated or initiated by a user of a computing device. For example, a user may manually instruct a computing device to request access to a cloud-based code-signing service by entering web credentials into a web portal, as opposed to allowing a software module on the computing device to automatically generate the request by automatically inputting security credentials into the web portal. In addition, an automatically generated request may be generated by a variety of mechanisms and/or software modules, such as requests generated by API's, application processes, drivers, signing automation agents (see definition below), and/or any other suitable mechanism and/or software module.

Identification module 104 may identify any type or form of automatically generated request. For example, an automatically generated request to sign a file may include a request to digitally sign a file, and more specifically, with reference to the instant disclosure, a request to digitally sign executables, scripts, code files, data files, documents (e.g., PDF files) and/or any other type or form of file that can be signed by a cloud-based code-signing service. In addition, an automatically generated request to sign a file may include a request to sign files in such a way that the signature can be used to verify the authenticity (i.e., author) and/or integrity of the file. For example, a request to sign a file may include a request to sign a file with a signature that can be used to verify an author of the file as well as certify that the file has not been altered, modified, or corrupted. An automatically generated request to sign a file may also include a request to sign a file with a variety of digital certificates, such as certificates issued by a publically trusted CA (and other production level certificates) and/or test certificates.

Identification module 104 may identify an automatically generated request from a signing automation agent to sign at least one file in a variety of ways. For example, identification module 104 may identify request 214 by identifying an attempt of signing automation agent 210 to sign into and/or access code-signing service 212. In at least one example, identification module 104 may identify request 214 when code-signing service 212 receives security credential 216 from signing automation agent 210. In various embodiments, identification module 106 may identify request 214 when signing automation agent 210 creates a signing set of files to be signed or when signing automation agent 210 attempts to upload a file to code-signing service 212.

In some embodiments, identification module 104 may identify request 214 when an automated build tool that is configured with signing automation agent 210 sends request 214 to code-signing service 212 (see description of FIG. 4). In at least one embodiment, identification module 104 may identify request 214 when a signing automation agent that is part of a file-sharing module sends request 214 to code-signing service 212 (see description of FIG. 5). In this embodiment, identification module 104 may identify request 214 by identifying an attempt by the file-sharing module to send, transfer, sync, and/or share file 208 with code-signing service 212.

In at least one embodiment, identification module 104 may identify a request for second factor authentication within or as part of request 214 ("second factor authentication" is defined below in the description of step 304). For example, signing automation agent 210 may request that file 208 not be signed until an administrator's security credentials have been requested, received, and verified. In some examples, signing automation agent 210 may request that code-signing service 212 follow specific rules for signing file 208. For example, signing automation agent 210 may request that file 208 be signed with a test certificate if no second factor authentication is received. In another example, signing automation agent 210 may request that file 208 be signed with a production certificate if or when second factor authentication is received. In another embodiment, signing automation agent 210 may request that code-signing service 212 wait a specified period of time to receive second factor authentication. Identification module 104 may identify any of the above-described requests from signing automation agent 210 in any other suitable way.

As used herein, the phrase "signing automation agent" generally refers to any software module configured to send requests to sign files to a code-signing server that is hosting a cloud-based code-signing service. A signing automation agent may generate requests via a variety of algorithms, mechanisms, and API calls and may be configured to communicate with a cloud-based code-signing server via any suitable network protocol. In some examples, a signing automation agent may generate requests by accessing and signing into secure web portals. In order to do so, the signing automation agent may use security credentials previously input by a software developer. For example, a software developer may, when configuring an automated build process, input a username and password that is then used by the signing automation agent during the automated build process to sign into a web portal that accesses a code-signing service.

As mentioned above, a signing automation agent may include a software module that automatically sends a request to sign files to a remote code-signing server as part of an automated build process. In any of the embodiments described herein that include an automated build process, the signing automation agent may be part of the automated build process, and may include a drop-in tool provided by a code-signing vendor that modularly replaces other code-signing tools by receiving the same input and/or API calls as those tools.

Alternatively, a signing automation agent may include a software module that generates automatic requests to sign files by sharing files with a remote code-signing service via a file-sharing module. In these embodiments, the signing automation agent may be configured to send requests to a code-signing server via a variety of file transfer protocols, APIs, and/or processes. For example, a signing automation agent may call, using a secure file transfer protocol, a service-specific API that sends a request to sync and sign a file being shared via a file-sharing module.

As used herein, the phrase "remote client" generally refers to any computing device configured to connect to a server via a network (e.g., remote client 202 in communication with code-signing server 206 via network 204). Examples of remote clients may include, without limitation, desktops, developer workstations, developer servers, and/or any other suitable computing device capable of sending code-signing requests to a code-signing server. A remote client may connect and/or communicate with a server via a network (e.g., the Internet) using any suitable network communication mechanisms and/or protocols.

The term "file" as used herein generally refers to (as briefly mentioned above) any type or form of file, code file, executable, document, data file, and/or script used in the development of software and/or firmware. For example, the term "file" may refer to a code file that is created after a compiler compiles one or more programming instructions (e.g., files with .exe, .dll, .mui, .cab, and .cpl extensions). Files may be any size and may be stored in a variety of configurations and file formats. For example, a file may be as small as a few kilobytes or as large as several gigabytes. In another example, a file may be a compiled executable file stored in a compressed file format (e.g., .rar or .zip). In some examples, files may be included with and/or reference other files, such as, e.g., those grouped together in a signing set and given the same signing set identification. In some configurations, a file may be part of a signing set that includes both files to be signed (e.g., application files) and "supporting" files that will remain unsigned but may provide metadata or other useful information about the files to be signed. Files may include files of any other suitable type, size, format, and/or configuration and may be part of any suitable signing set configuration.

As illustrated in FIG. 3, at step 304 one or more of the systems described herein may verify a security credential that authorizes the remote client to access the cloud-based code-signing service. For example, verification module 106 may, as part of code-signing service 212, verify security credential 216.

As used herein, the phrase "security credential" generally refers to any type or form of data and/or digital information that can be used to verify whether a software module and/or user is permitted access to a service, system, and/or file on a computing device. Examples of security credentials may include, without limitation, usernames, passwords, user IDs, email verifications, digital signatures, biometric security credentials (e.g., fingerprint or optic scanners), and/or any other suitable type or form of security credentials. In some examples, a security credential may include a set of security data, such as a username and password combination.

Verification module 106 may verify security credential 216 in a variety of ways. For example, verification module 106 may receive and verify a username and password combination sent from signing automation agent 210. In addition, verification module 106 may verify security credential 216 at any suitable time during execution of code-signing service 212. For example, verification module 106 may verify security credential 216 before or after receiving file 208 or immediately after identification module 104 identifies request 214. In various embodiments, verification module 106 may receive and verify a security credential provided by an automated build tool on remote client 202.

Alternatively, in embodiments that include a file-sharing module, verification module 106 may verify security credential 216 by verifying that a connection between the file-sharing module and a cloud-based code-signing service is secure (see description of FIG. 5). For example, verification module 106 may verify that signing automation agent 210 is sharing files with code-signing service 212 via a secure file transfer protocol, and therefore allow signing automation agent 210 access to code-signing service 212. In at least one embodiment, verification module 106 may help establish, facilitate, and/or maintain secure communications between signing automation agent 210 and code-signing service 212. For example, verification module 106 may encrypt and/or decrypt code files shared between code-signing server 206 and remote client 202.

In at least one embodiment, verification module 106 may use some type or form of second factor authentication in addition to or in conjunction with verifying security credential 216. As used herein, the phrase "second factor authentication" generally refers to the second part of a two-part security process. Second factor authentication may include any combination of security processes and/or security credentials to determine whether a particular user, software module, computing device, application process, and/or mechanism may access and/or use a particular file, service, system, and/or process. For example, second factor authentication may include verifying a second username and password combination or requesting administrator authorization from a code-signing administrator. Second factor authentication may also refer to the use of a hardware or software credential token that generates OTPs (one-time-passwords).

A code-signing administrator may include any individual capable of making administrative decisions about file 208 and able to provide second factor authentication in relation to a request to sign file 208. For example, a code-signing administrator may be a project manager capable of providing code-signing service 212 with a second security credential (e.g., an administrator username and password).

In some embodiments, verification module 106 may send a request for second factor authentication to a code-signing administrator on a remote computing device. For example, verification module 106 may send an email alert to a project manager's terminal requesting that an email be returned that contains the project manager's username and password. In at least one embodiment, verification module 106 may, after performing second factor authentication, authorize remote client 202 to access code-signing service 212. In some examples, verification module 106 may receive second factor authentication from a code-signing administrator via a web portal or via some other type or form of web-browser authentication process. In at least one example, verification module 106 may receive second factor authentication via a mobile app or a text message.

In some embodiments, verification module 106 may, when requesting second factor authentication, define and/or identify (as discussed in the description of step 302) a window of time within which second factor authentication must occur before denying remote client 202 access to code-signing service 212. For example, after verification module 106 verifies security credential 216, verification module 106 may wait one hour to receive an administrator username and password before denying signing automation agent 210 access to code-signing service 212. Verification module 106 may set any other suitable time limit, such as a few minutes, an hour, a few hours, etc.

As illustrated in FIG. 3, at step 306 one or more of the systems described herein may receive, at the cloud-based code-signing service, the file from the signing automation agent. For example, reception module 108 may receive, as part of code-signing service 212, file 208 from signing automation agent 210.

Reception module 108 may receive file 208 in a variety of ways. For example, signing automation agent 210 may upload file 208 to reception module 108 via a file transfer protocol (e.g., File Transfer Protocol (FTP)). In examples where signing automation agent 210 is part of an automated build tool, the automated build tool may upload file 208 to reception module 108. In at least one embodiment, reception module 108 may receive file 208 via a file-sharing module. Reception module 108 may receive file 208 from signing automation agent 210 via any other suitable process and/or file-sharing method.

Reception module 108 may receive file 208 at a variety of times. For example, reception module 108 may request that signing automation agent 210 upload file 208 immediately after verification module 106 verifies security credential 216. In another example, reception module 108 may wait until verification module 106 performs some form of second factor authentication before receiving file 208. In at least one embodiment, reception module 108 may receive file 208 while verification module 106 waits for second factor authentication (regardless of whether second factor authentication is successful).

As illustrated in FIG. 3, at step 308 one or more of the systems described herein may sign, by the cloud-based code-signing service, the file. For example, signature module 110 may, as part of code-signing service 212, sign file 208.

Signature module 110 may sign file 208 in a variety of ways. For example, signature module 110 may sign file 208 with a production certificate, such as a certificate from a publically trusted CA. In at least one embodiment, signature module 110 may sign file 208 with a test certificate, or with some type or form of non-production, non-commercial certificate. For example, signature module 110 may, by default or unless otherwise instructed by signing automation agent 210, sign file 208 with a temporary certificate set to expire within a few hours of signing. In some embodiments, signature module 110 may sign file 208 with a test certificate if no second factor authentication is received.

In some examples, signature module 110 may analyze request 214 to determine specific rules to follow when signing file 208. For example, signature module 110 may decide, after analyzing request 214, to sign file 208 with a production certificate if a second security credential is verified within one hour of the time the request was submitted. Alternatively, signature module 110 may decide to, based on request 214, sign file 208 with a test certificate if no second security credential is received within a predetermined period of time.

As illustrated in FIG. 3, at step 310 one or more of the systems described herein may send the signed file from the cloud-based code-signing service to the remote client. For example, transfer module 112 may, as part of code-signing service 212, send signed file 218 to remote client 202.

Transfer module 112 may send signed file 218 to remote client 202 in a variety of ways. For example, transfer module 112 may send signed file 218 to remote client 202 via a file transfer protocol (e.g., FTP) or via any other suitable process, mechanism, and/or protocol. In some embodiments, transfer module 112 may send signed file 218 to an automated build tool stored on remote client 202. Alternatively, transfer module 112 may, as part of a file-sharing module maintained on both code-signing server 206 and remote client 202, share signed file 218 with remote client 202 via the file-sharing module.

As briefly mentioned in the description above, signing automation agent 210 may, in some embodiments, be part of an automated build tool. In these embodiments, the automated build tool may be configured to automatically sign file 208 as part of a build process that builds the code file via a series of one or more code-building steps. For example, FIG. 4 illustrates an exemplary system 400 wherein an automated build tool 420 on a coding computer 418 may attempt to access a code-signing tool 404 on a software security server 402. Coding computer 418 may be a computing device used by a developer to automatically build software projects via automated build tool 420. System 400 depicts how developers in a Continuous Integration (CI) type of environment may, using their own automated build tools and a drop-in code signing tool (such as, e.g., signing automation agent 210 in FIG. 2), automatically sign their code with a production certificate via a cloud-based code-signing service.

In FIG. 4, automated build tool 420 may build code file 406 via one or more code-building steps (e.g., via a code-building and compiling process that links function libraries with code files and compiles them into a binary file). Automated build tool 420 may, as the last step of an automated build process, attempt to access code signing tool 404 via network 412 by way of a drop-in tool that has been configured to receive code-signing API calls (or, in another example, code-signing commands, such as a set of code-signing parameters, from a command line) from the automated build tool. The drop-in tool may then covert those API calls into API calls that can interface with code signing tool 404. For example, the drop-in tool may be configured to replace other local code-signing tools (e.g., jarsigner) and may be configured to receive the same input and/or APIs as those tools so that developers experience minimum disruption to their automated build process. In other words, developers using automated build tool 420 need only replace the local signing tool (that signs code with local certificates) with a drop-in tool that receives the same input as the local signing tool. This may, in turn, free the developers from needing to design and implement their own tools for accessing a cloud-based code-signing service.

In this illustration, automated build tool 420 may access code signing tool 404 by signing into a web portal with a username and password that were previously input into automated build tool 420 by a developer. The developer may have also configured automated build tool 420 to request authentication from a project manager as well as request that code file 406 be signed with a production certificate if approved by the project manager. When code signing tool 404 detects the request to sign code file 406, code signing tool 404 may verify the password for User1 and then download code file 406 from coding computer 418. Code signing tool 404 may then send an email to the project manager on administrator computer 414 requesting email verification 416.

In this illustration, code signing tool 404 may receive authorization from the project manager via an administrator username and password combination contained in secure, encrypted email verification 416. Based on verification received from both automated build tool 420 and the project manager on administrator computer 414, code signing tool 404 may sign code file 406, thus creating a signed code file 408 that has been signed with a production certificate 410. Code signing tool 404 may then send signed code file 408 back to automated build tool 420, completing the signing step of the automated build process. In this way, a developer may obtain, via an automated build and signing process, a CA-signed code file that is ready to be distributed, tested, and/or sold.

Alternatively, some developers may wish to automatically sign their code via a file-sharing module. As opposed to an automated build tool that uses security credentials to sign into, e.g., a web portal, a file-sharing module may access a code signing service using a secure shared folder that is stored on two separate computing devices. As such, FIG. 5 is an illustration of an exemplary system 500 that depicts how a file-sharing module may be used to automatically sign one or more code files shared between a server and a remote client.

A developer of coding computer 514 may want to automatically sign code file 508 using cloud-based code signing tool 504. To accomplish this, the developer may create a shared folder that is part of file-sharing module 506. This folder may be a secure, shared folder that is configured to automatically sync files with software security server 502. In one example, file-sharing module 506 may immediately upload code file 508 to software security server 502 when code file 508 is stored within a folder in file-sharing module 506 on coding computer 514. In another example, file-sharing module 506 may be configured to wait a predetermined amount of time (e.g., five minutes) before uploading code file 508 to software security server 206. Once code file 508 is received on software security server 502, code-signing tool 504 may retrieve and sign code file 508, thus creating signed code file 510. After creating signed code file 510, code-signing tool 504 may transfer code file 510 back to file-sharing module 506. At this point, file-sharing module 506 may automatically sync signed code file 510 with coding computer 514. In this way, a developer may obtain automatically signed software from a cloud-based code-signing service by sharing code files with a software security server via a file-sharing module.

As explained above in connection with method 300 in FIG. 3, it may be useful to software developers to incorporate cloud-based code-signing services into their automated build processes, especially in large Continuous Integration (CI) type environments where code-signing is often the last step in an automated build process. While some solutions may allow developers to create their own custom tools to accomplish this task (by providing them with, e.g., an API layer that can access cloud-based code-signing services), many developers may feel uncomfortable designing and/or implementing such tools on their own.

The instant disclosure may overcome this problem by providing developers access to a cloud-based code-signing service via a drop-in tool that seamlessly integrates with an automated build process. Specifically, by receiving files from a remote client, performing appropriate security measures (e.g., verifying security credentials), signing the files and then sending them back to the remote client, the systems and methods presented herein may provide developers with a cloud-based code-signing service that is hands-free, secure, and capable of being implemented within a variety of automated build environments. Additionally or alternatively, the systems and methods described herein may provide developers with access to a cloud-based code-signing service via a file-sharing module on a remote client that automatically and securely syncs files with the cloud-based code-signing service. The code-signing service may then sign the files and sync them back to the remote client via the file sharing module.

Figure 6:
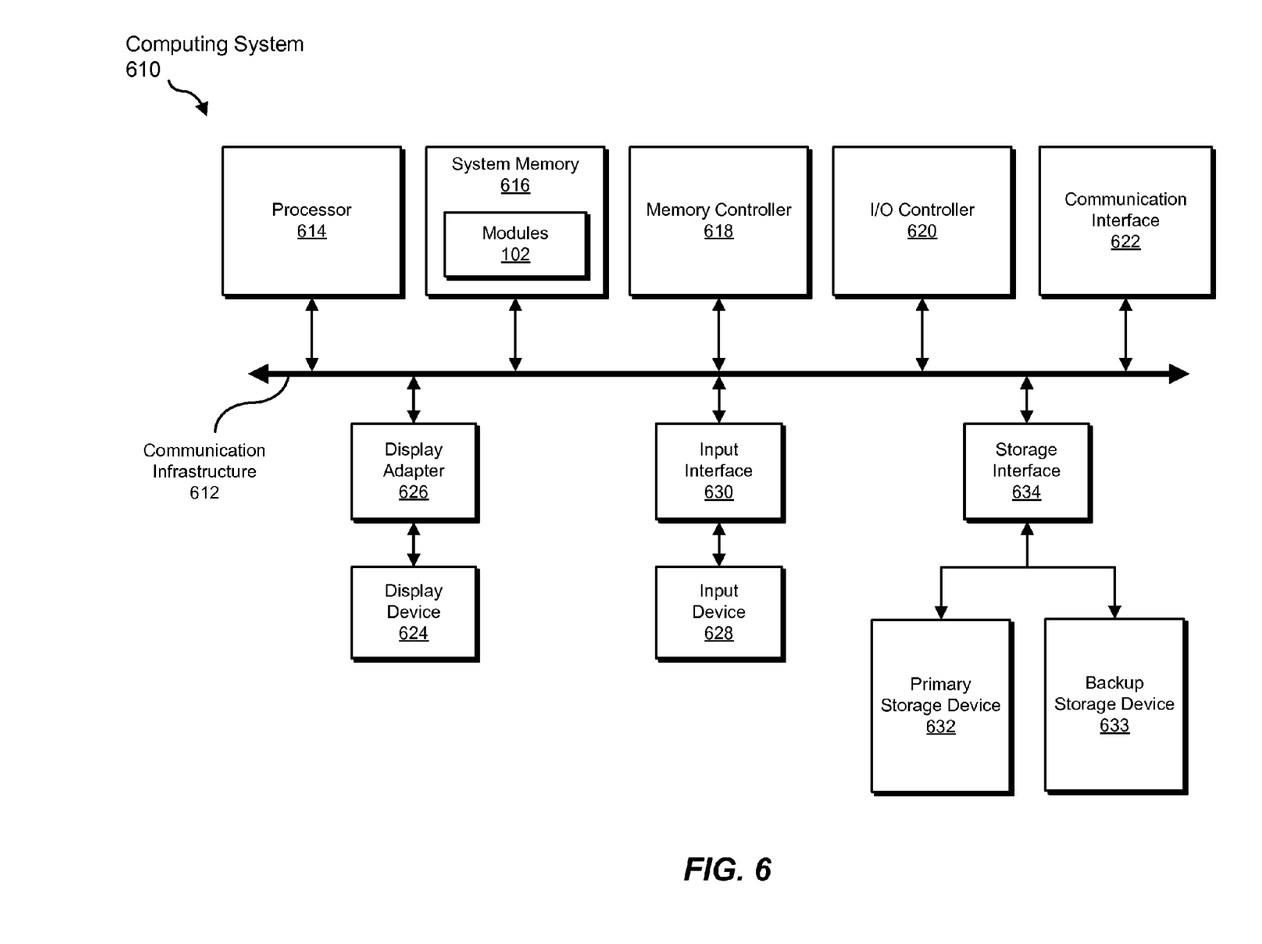
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
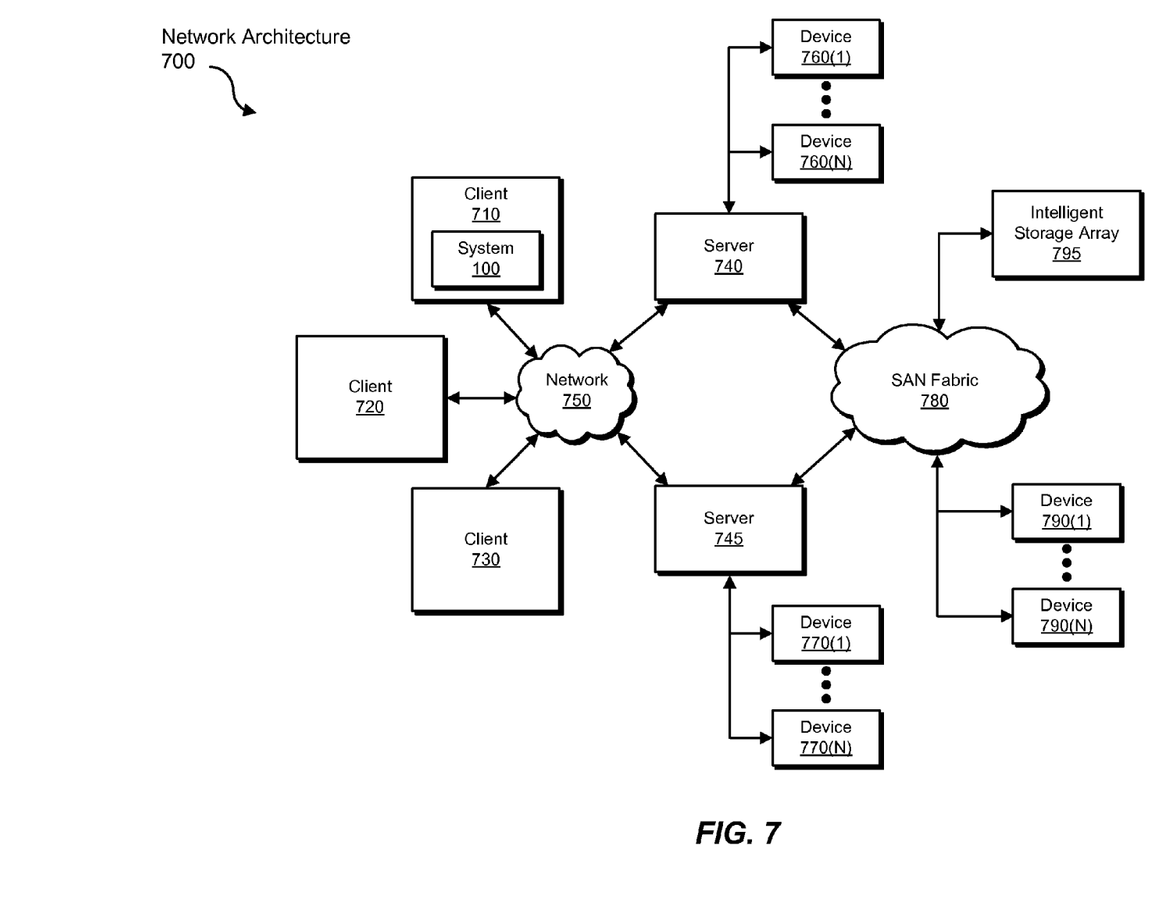
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for automating cloud-based code-signing services.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.)

may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a file from a remote client and then transform the file by signing the file. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automating cloud-based code-signing services, at least a portion of the method being performed by a computing device comprising at least one processor, the method comprising:
   identifying, at a cloud-based code-signing service, an automatically generated request from a signing automation agent on a remote client to sign at least one file, the signing automation agent comprising a software module;
   verifying a security credential that authorizes the remote client to access the cloud-based code-signing service, the security credential having been submitted by the signing automation agent for verification by the cloud-based code-signing service;
   receiving, at the cloud-based code-signing service, the file from the signing automation agent;
   signing, by the cloud-based code-signing service, the file;
   sending the signed file from the cloud-based code-signing service to the remote client.

2. The computer-implemented method of claim 1, wherein:
   an automated build tool comprises the signing automation agent;
   the automated build tool is configured to automatically sign the file via the cloud-based code-signing service as part of a build process that builds the file via a series of one or more code-building steps.

3. The computer-implemented method of claim 1, further comprising requesting, by the cloud-based code-signing service, second factor authentication from a code-signing administrator.

4. The computer-implemented method of claim 3, further comprising receiving, at the cloud-based code-signing service, second factor authentication from the code-signing administrator.

5. The computer-implemented method of claim 4, wherein signing the file comprises signing the file with a production certificate after receiving second factor authentication from the code-signing administrator.

6. The computer-implemented method of claim 1, wherein signing the file comprises signing the file with a test certificate when no second factor authentication occurs.

7. The computer-implemented method of claim 1, wherein:
   the signing automation agent comprises a file-sharing module that is configured to share files with the cloud-based code-signing service;
   identifying the automatically generated request from the signing automation agent comprises receiving the file from the file-sharing module.

8. The computer-implemented method of claim 7, wherein verifying the security credential comprises verifying a secure connection between the file-sharing module and the cloud-based code-signing service.

9. The computer-implemented method of claim 7, wherein sending the signed file from the cloud-based code-signing service to the automated signing agent comprises sharing the signed file with the file-sharing module.

10. A system for automating cloud-based code-signing services, the system comprising:
    an identification module, stored in memory, that identifies, at a cloud-based code-signing service, an automatically generated request from a signing automation agent on a remote client to sign at least one file, the signing automation agent comprising a software module;
    a verification module, stored in memory, that verifies a security credential that authorizes the remote client to access the cloud-based code-signing service, the security credential having been submitted by the signing automation agent for verification by the cloud-based code-signing service;
    a reception module, stored in memory, that receives the file from the signing automation agent;
    a signature module, stored in memory, that signs, by the cloud-based code-signing service, the file;
    a transfer module, stored in memory, that sends the signed file from the cloud-based code-signing service to the remote client;
    at least one physical processor that executes the identification module, the verification module, the reception module, the signature module, and the transfer module.

11. The system of claim 10, wherein:
    an automated build tool comprises the signing automation agent;
    the automated build tool is configured to automatically sign the file via the cloud-based code-signing service as part of a build process that builds the file via a series of one or more code-building steps.

12. The system of claim 10, wherein the verification module further requests, by the cloud-based code-signing service, second factor authentication from a code-signing administrator.

13. The system of claim 12, wherein the verification module further receives, at the cloud-based code-signing service, second factor authentication from the code-signing administrator.

14. The system of claim 13, wherein the signature module signs the file with a production certificate after the verification module receives second factor authentication from the code-signing administrator.

15. The system of claim 10, wherein the signature module signs the file with a test certificate when no second factor authentication occurs.

16. The system of claim 10, wherein:
    the signing automation agent comprises a file-sharing module that is configured to share files with the cloud-based code-signing service;
    the identification module identifies the automatically generated request by receiving the file from the file-sharing module.

17. The system of claim 16, wherein the verification module verifies the security credential by verifying a secure connection between the file-sharing module and the cloud-based code-signing service.

18. The system of claim 16, wherein the transfer module sends the signed file from the cloud-based code-signing service to the automated signing agent by sharing the signed file with the file-sharing module.

19. A non-transitory computer-readable medium comprising one or more computer-executable instructions that, when executed by at least one processor of a computing device, cause the computing device to:
- identify, at a cloud-based code-signing service, an automatically generated request from a signing automation agent on a remote client to sign at least one file, the signing automation agent comprising a software module;
- verify a security credential that authorizes the remote client to access the cloud-based code-signing service, the security credential having been submitted by the signing automation agent for verification by the cloud-based code-signing service;
- receive, at the cloud-based code-signing service, the file from the signing automation agent;
- sign, by the cloud-based code-signing service, the file;
- send the signed file from the cloud-based code-signing service to the remote client.

20. The non-transitory computer-readable medium of claim 19, wherein the one or more computer-executable instructions cause the computing device to request, by the cloud-based code-signing service, second factor authentication from a code-signing administrator.

* * * * *